_United States Patent Office_

3,389,058
Patented June 18, 1968

3,389,058
PROCESS FOR PRODUCING 5'-INOSINIC ACID THROUGH MIXED CULTURE OF TWO DIFFERENT MICROORGANISMS
Shukuo Kinoshita, Tokyo, Yoshiaki Kawamori, Shizuoka-ken, Kunizo Mizuhara, Machida-shi, Yoshinobu Miyamura, Shizuoka-ken, and Takeo Suzuki, Machida-shi, Japan, assignors to Kyowa Hakko Kogyo Co., Ltd., Tokyo, Japan, a corporation of Japan
No Drawing. Continuation of application Ser. No. 372,671, June 4, 1964. This application Nov. 1, 1966, Ser. No. 591,338
Claims priority, application Japan, June 6, 1963, 38/28,753
9 Claims. (Cl. 195—28)

ABSTRACT OF THE DISCLOSURE

Method for the production of 5'-inosinic acid by fermentation which comprises culturing a mixture of a hypoxanthine accumulating mutant of a *Brevibacterium ammoniagenes* with a *Brevibacterium ammoniagenes* microorganism having a high nucleotide pyrophosphorylase activity and ability to accumulate phosphoribosyl pyrophosphate in a culture medium constituted by a mixture of (1) a cultured medium obtained from the cultivation in a phosphate-containing culture medium of a hypoxanthine accumulating mutant of a *Brevibacterium ammoniagenes* and contraining precursor amounts of hypoxanthine and (2) a cultured medium obtained from the cultivation in a phosphate-containing culture medium of a *Brevibacterium ammoniagenes* microorganism having a high nucleotide pyrophosphorylase activity and ability to accumulate phosphoribosyl pyrophosphate. Exemplary of the first-described mutant are *Brevibacterium ammoniagenes* ATCC 15454 and ATCC 15187. Exemplary of the second-described mutant is *Brevibacterium ammoniagenes* ATCC 6872.

---

This application is a continuation of application Ser. No. 372,671, filed June 4, 1964, which is now abandoned.

This invention relates to a process for the preparation of 5'-inosinic acid on an industrial scale, i.e., at low cost and high yield.

5'-inosinic acid, along with guanylic acid, xanthylic acid and other purine nucleotides, has found rapidly expanding applications as a chemical condiment. Accordingly, a number of processes for its manufacture on an industrial scale have been proposed. These methods include direct fermentation with microorganisms, conversion of nucleic bases obtained by chemical synthesis into nucleotides by microbic action, and phosphorylation through a chemical process of microbically formed nucleoside. However, none of the processes thus far proposed is free from technical difficulties, and it is pointed out that much labor and an extensive investment in equipment are required for recovery and refining of nucleotide because it is formed in low concentrations.

The present invention relates to the discovery of a process for accumulating a large amount of the desired product by effectively combining certain microorganisms which release unique enzymes in their culture medium.

The instant invention, therefore, has as its objective the provision of an industrially acceptable method for the production of the valuable 5'-inosinic acid, which is free of the disadvantages present in the known processes.

The process comprises (1) culturing a mixture of (a) a microorganism which accumulates a remarkably large amount of hypoxanthine and (b) a microorganism which produces an enzymatic system for direct conversion of nucleic base into nucleotide or (2) separately culturing said microorganisms and then mixing them together. The culturing is carried out in a medium containing inexpensive saccharide (carbohydrate), nitrogen source, inorganic salt, and the like.

The exact mechanism of the process whereby the 5'-inosinic acid is formed is not known. However, without desiring to be bound thereby, it is felt that the process may be explained in the following manner. As is known, hypoxanthine is a base which is a constituent part of 5'-inosinic acid, and can be a precursor of the acid. Nucleotide pyrophosphorylase is a generic term for the enzymes which synthesize nucleotides by subjecting nucleic acid bases to the action of phosphoribosyl pyrophosphate or adenosine triphosphate and ribose-5-phosphoric acid. Microorganisms which possess high phosphoribosyl-pyrophosphorylase activity produce 5'-inosinic acid in the presence of hypoxanthine and D-ribose-5-phosphoric acid. A process for industrial production of the desired substance at low cost must then supply the constituent units of 5'-inosinic acid, that is, hypoxanthine, D-ribose-5-phosphoric acid, an enzyme system which combines said constituents, in an inexpensive and foolproof manner.

The microorganisms useful in the instant invention as ones accumulating a large amount of hypoxanthine are *Brevibacterium ammoniagenes* No. 7209–1 (ATCC No. 15454) and *Brevibacterium ammoniagenes* ATCC No. 15187 (mutant strain of ATCC No. 6872 obtained by treatment with chemical agents).

The microorganism is cultured in a culture medium which permits the said microorganism to store up large amounts of hypoxanthine. This culture medium is referred to herein as the seed and the main culture media. It is composed of carbohydrate (saccharide) materials such as glucose, amylodextrin and other saccharides or waste molasses; nitrogen sources such as urea, ammonia or ammonium salts; inorganic salts such as potassium phosphate dibasic, potassium phosphate monobasic, magnesium sulfate, potassium sulfate, sodium chloride, and calcium chloride. Where necessary, the medium contains yeast extract, caseate, soybean-cake hydrolyzate, peptone, corn steep liquor and other ingredients which contains factors for promoting the growth of said microorganisms and accumulation of hypoxanthine. The medium also may contain small amounts of biotin, adenine and the like, which serve the above purpose.

The aforementioned strains are inoculated in the seed culture media of the foregoing composition, and cultured at 30° C. for from about 16 to about 24 hours, whereby the cells grow well. Following this, the cultured cells are removed to the main culture media of such compositions which are suitable for accumulating hypoxanthine. In this main media the strains are further cultured while being aerated with stirring at from 28° to 40° C. for from about 2 to about 4 days. During the cultivation it is desirable to adjust the pH to 6.0 to 8.0 with ammonia or urea. Hypoxanthine is accumulated gradually with consumption of saccharides until the hypoxanthine production amounts to 3 to 8 mg. per ml. of the media. The resulting fluid is called the culture fluid A for the purpose of this specification.

As microorganisms which possess activity to produce synthesizing enzyme, i.e., nucleotide pyrophosphorylase, and to accumulate phosphoribosyl pyrophosphate, mutant strains of both of the species of microorganisms mentioned above as being capable of accumulating hypoxanthine may be used. By culturing said mutant strains in the same manner as in the case of the hypoxanthine accumulating microorganism, a culture fluid having a high nucleotide pyrophosphorylase activity is obtained. That is, gradual emergence of nucleotide pyrophosphorylase-activity is observed in about 24 hours of aerated culture with stirring. The activity reaches the maximum in 54 to 66 hours when sugar in the media is consumed to the point where percentage drops to 4 to 2%. The fluid prepared in this manner is called the culture fluid B for the purpose hereof.

The media employed for the cultivation of this organism are the same or similar to those employed in culturing the hypoxanthine accumulating microorganisms and the method of cultivation may also be the same, i.e., the culture in a seed culture medium followed by the culturing in the main culture medium.

The culture fluids A and B are obtained from the cultivations of the hypoxanthine accumulating microorganism and the nucleotide pyrophosphorylase active microorganism respectively. These culture fluids are mixed in a suitable ratio and further subjected to aeration culture with stirring. The ratio in which the fluids are present (A:B) may be from about 1:1 to about 2:1. It is preferred however that the fluids be employed in approximately equal proportions.

In the combined culture media hypoxanthine is combined with D-ribose-5-phosphoric acid accumulated in the media to form 5'-inosinic acid. The time required for the reaction is usually about 24 to 36 hours, though it is dependent upon the amounts of precursor and enzyme accumulated in the culture fluids A and B. This enzymatic reaction can be further promoted and stabilized by adding various saccharides or other nutrients to the culture fluids A and B following mixing thereof.

After full accumulation of 5'-inosinic acid has been observed in the combined culture medium, the cells are removed as for example by centrifuging. The resulting liquid is subjected to ion exchange treatment in the following manner: The cell free liquid is allowed to pass through Dia-ion SK1A (sulfonated copolymer of styrene and divinyl benzene), ion exchange resin eluted with water, so that the section below pH 2.0 was adsorbed to Dia-ion SA21A (polystyrene quaternary ammonium strongly basic exchange resin), and then inosinic acid section is obtained by eluted with 0.5 N-hydrochloric acid. Pure 5'-inosinic acid is obtained from this section, when neutralized with caustic soda and subsequently concentrated.

In addition to the foregoing procedure of culturing two different culture fluids A and B in separate vessels and thereafter mixing them together, it is also possible to inoculate two different strains into a single culture medium at the same time or one a little faster than the other, and thereby allow them to store up 5'-inosinic acid through perfect symbiotic culture. In the mixed culture fluid, it is theorized that hypoxanthine produced by a strain A is converted synthetically into 5'-inosinic acid by a strain B having nucleotide pyrophosphorylase activity and ability to accumulate phosphoribosyl pyrophosphate. This is a typical example of symbiotic fermentation by two different types of strains. In this case, 5'-inosinic acid is recovered and refined with a combination of cation and anion exchange resins, in the same manner as the method previously described. Needles of sodium 5'-inosinate are obtained.

In conducting this aspect of the invention it is possible for example to preliminarily cultivate the different strains of microorganisms in different portions of the same seed culture medium for the desired period of time. Following the completion of the preliminary cultivation the respective cultured cells may be removed to the main culture medium where the cultivation is conducted in a symbiotic manner. The composition of the media employed in this aspect of the invention is the same as employed in the previously noted aspects.

Having thus described the invention, the same will be illustrated by the following examples. These examples are not to be construed as limiting the invention but are merely illustrative thereof.

EXAMPLE 1.—PREPARATION OF CULTURE FLUID A (1) Seed culture

A culture medium comprising 3.0% of glucose, 2.0% of yeast extract, 1.0% of peptone, and 0.25% of sodium chloride is sterilized with heat at 120° C. for 15 minutes. Then, *Brevibacterium ammoniagenes* No. 7209–1 (ATCC No. 15454) is inoculated into the above medium and cultured with shaking at 30° C. for 24 hours.

(2) Main culture 3 l. of a culture medium comprising 10% of glucose, 0.5% of yeast extract, 0.4% of potassium phosphate dibasic, 0.4% of potassium phosphate monobasic, 0.4% of magnesium sulfate, and 0.01% of calcium chloride is introduced into a 5 l. jar fermenter, sterilized with heat at 120 C. for 20 minutes, inoculated with 300 ml. of the seed culture fluid prepared as above. After culture for three days with the pH adjusted to 7.0 with ammonia water, the amount of hypoxanthine in the cultured medium is estimated at 4.1 mg./ml.

PREPARATION OF CULTURE FLUID B (1) Seed culture

A culture medium containing 3% of glucose, 2.0% of yeast extract, 1.0% of peptone, and 0.25% of sodium chloride is sterilized at 120° C. for 15 minutes, and *Brevibacterium ammoniagenes* ATCC No. 6872 is cultured in this medium with shaking at 30° C. for 24 hours.

(2) Main culture 3 l. of a culture medium comprising 8% of glucose, 0.4% of yeast extract, 0.4% of potassium phosphate dibasic, 0.4% of potassium phosphate monobasic, 0.4% of magnesium sulfate and 0.01% of calcium chloride is placed into a 5 l. jar fermenter, sterilized with heat at 120° C. for 10 minutes, inoculated with 300 ml. of the seed culture prepared as above, and further culture is effected for 3 days as the medium is aerated with stirring while the pH is maintained at 7.0 with ammonia water.

1.5 l. of the culture fluid A is mixed with the same amount of the culture fluid B. The mixture is replenished with glucose up to 5% of the total volume, and is further subjected to aeration culture with the pH constantly adjusted to 7.0 with ammonia water, for 3 days. The amount of 5'-inosinic acid estimated upon completion of the fermentation is 12.6 mg./ml.

5 l. of the resultant fluid is heated to coagulate the cells. The mixture is centrifuged and the cells are eliminated. Then, the fluid is allowed to pass through Dia-ion SK1A ((trade name of product by Mitsubishi Chemical Industries Ltd., Japan), sulfonated copolymer of styrene and divinyl benzene), ion exchange resin eluted with water, so that the section below pH 2.0 was adsorbed to Dia-ion SA21A ion exchange resin ((trade name of product by Mitsubishi Chemical Industries Ltd., Japan) polystyrene quaternary ammonium strongly basic exchange resin), and then eluted with 0.5 N-hydrochloric acid, when 240 ml. of the inosinic acid section is obtained. This section, when neutralized with caustic soda and subsequently concentrated, yields 42.8 g. of crystalline sodium 5'-inosinate.

EXAMPLE 2.—PREPARATION OF CULTURE FLUID A (1) Seed culture

A culture medium containing 3.0% of glucose, 4.0% of fish soluble, 1.0% of peptone, and 0.25% of sodium chloride is sterilized by heating at 120° C. for 15 minutes, and then *Brevibacterium ammoniagenes* ATCC No. 15187 (Mutant strain of ATCC No. 6872) is inoculated and cultured with shaking in this medium at 30° C. for 24 hours.

(2) Main culture 3 l. of a culture medium comprising 10% of glucose, 1.0% of rice bran, 1.0% of soybean cake hydrolyzate, 0.6% of potassium phosphate dibasic, 0.6% of potassium phosphate monobasic, 0.6% of magnesium sulfate, and 0.01% of calcium chloride is introduced into a 5 l. jar fermenter, sterilized with heat at 120° C. for 20 minutes, and then inoculated with 300 ml. of the preliminary cultured medium of said strain prepared as above. With the pH adjusted to 7.0 with ammonia water, culture is further continued at 30° C. for 3 days. In 60 hours after the inoculation, hypoxanthine in the cultured medium is estimated at 3.2 mg./ml.

PREPARATION OF CULTURE FLUID B (1) Preliminary culture

A culture medium containing 3% of glucose, 2.0% of corn steep liquor, 1.0% of peptone, and 20γ/l. of biotin is sterilized by heating at 120° C. for 15 minutes, and then *Brevibacterium ammoniagenes* ATCC No. 6872 is cultured in this medium with shaking at 30° C. for 18 hours.

(2) Main culture 3 l. of a culture medium comprising 8% of glucose, 1.0% of corn steep liquor, 0.4% of potassium phosphate dibasic, 0.4% of potassium phosphate monobasic, 0.4% of magnesium sulfate, 0.01% of calcium chloride, and 30γ/l. of biotin, is placed in a 5 l. jar fermenter, sterilized by heating at 120° C. for 20 minutes, and inoculated with 300 ml. of the preliminary cultured medium. The medium is subjected to aeration culture with stirring at 30° C. for 48 hours with the pH adjusted to 6.8 to 8.0 with a 15% urea solution.

2 l. of the culture fluid A is mixed with 1 l. of the culture fluid B, and the mixture is further aerated with stirring at 32° C. In 48 hours after the mixing, the amount of inosinic acid in the mixed fluid is estimated at 8.5 mg./ml. 2 l. of this fluid, upon treatment in the same manner as in Example 1, affords 11.35 g. of crystalline sodium 5'-inosinate.

EXAMPLE 3

(1) Seed culture

A culture medium containing 3.0% of glucose, 2.0% of yeast extract, 1.0% of peptone, and 0.25% of sodium chloride is sterilized by heating at 120° C. for 15 minutes. In different portions of this medium, a hypoxanthine-productive strain, i.e. *Brevibacterium ammoniagenes* No. 7209–1 (ATCC No. 15454) (A) and a nucleotide-pyrophosphorylase-productive microorganisms, i.e., *Brevibacterium ammoniagenes* ATCC No. 6872 (B) are separately cultured with shaking at 30° C. for 24 hours.

(2) Main culture 3 l. of a culture medium comprising 12% of glucose, 1.0% of yeast extract, 0.5% of potassium phosphate dibasic, 0.5% of potassium phosphate monobasic, 0.5% of magnesium sulfate, and 0.01% of calcium chloride, is introduced into a 5 l. jar fermenter, sterilized with heat at 120° C. for 20 minutes, inoculated with 300 ml. of the preliminary cultured medium of the strain (A) referred to above, and is subjected to aeration culture with stirring for 120 hours while the pH was maintained at 7.0. Then, 300 ml. of the cultured medium of the strain (B) is inoculated in the same medium and further cultured for 72 hours. Accumulation of 5'-inosinic acid in the culture fluid amounts to 5.0 mg./ml.

2 l. of this culture fluid is treated in the same manner as in Example 1. Needles of sodium 5'-inosinate is obtained in an amount equivalent to 8.2 g. of pure product.

EXAMPLE 4

*Brevibacterium ammoniagenes* No. 7209–1 (ATCC No. 15454) is used as a hypoxanthine-productive strain, and is cultured for 72 hours in the same manner as illustrated in Example 1. Hypoxanthine stored up in the cultured medium amounts to 4.3 mg./ml. This cultured medium is centrifuged to remove the cells, and, to the residual fluid, 10% of glucose, 0.4% of potassium phosphate dibasic, 0.4% of potassium phosphate monobasic, 0.4% of magnesium sulfate, 30γ/l. of biotin, 2γ/ml. of calcium D-pantothenate are added. The mixture is sterilized by heating at 120° C. for 10 minutes, and is inoculated with *Brevibacterium ammoniagenes* ATCC No. 6872 cultured in the manner as illustrated in Example 1, in an amount equivalent to 5% of the total amount. The strain is cultured at 30° C. for 96 hours while the pH is adjusted to 7.0 with ammonia water. 9.8 mg. of 5'-inosinic acid is formed per ml. of the cultured medium. Upon treatment by the same method as described in Example 1, 2 l. of the fluid give crystalline sodium 5'-inosinate in an amount equivalent to 12.4 g. of pure product.

EXAMPLE 5

The same procedure as in Example 1, was followed excepting that *Brevibacterium ammoniagenes* ATCC No. 15187 is used as the hypoxanthine-productive strain. 5.2 mg./ml. of hypoxanthine is accumulated in the cultured medium. Above cultured medium is sterilized with heat. It is added to a cultured medium (prepared in the same manner as in Example 1) of *Brevibacterium ammoniagenes* ATCC No. 6872 cultured separately in 5 l. jar fermenter. The addition is made on the 24th, 36th, and 48th hour of culture, each time in an amount equivalent to 80% of the total cultured medium. The mixtures are slowly agitated while the temperature is kept at 30° C. 30 hours after the addition, the amounts of 5'-inosinic acid in the respective jar fermenters are estimated. The analytical values obtained are as tabulated below.

Time of addition: Amount, mg./ml.
  24th hour after commencement of culture _____ 5.8
  36th hour after commencement of culture _____ 7.6
  48th hour after commencement of culture _____ 8.1

As many apparently widely different embodiments of the invention may be made without departing from the spirit and scope thereof, it is to be noted that the invention is not to be limited to the specific embodiments hereof, except as defined in the appended claims.

What is claimed is:

1. A method for the production of 5'-inosinic acid by microorganismal fermentation which comprises culturing a mixture of a hypoxanthine accumulating mutant of a *Brevibacterium ammoniagenes* with a *Brevibacterium ammoniagenes* microorganism having a high nucleotide pyrophosphorylase activity and ability to accumulate phosphoribosyl pyrophosphate in a culture medium constituted by a mixture of (1) a cultured medium obtained from the cultivation in a phosphate-containing culture medium of a hypoxanthine accumulating mutant of a *Brevibacterium ammoniagenes* and containing precursor amounts of hypoxanthine, and (2) a cultured medium obtained from the cultivation in a phosphate-containing culture medium of a *Brevibacterium ammoniagenes* microorganism having a high nucleotide pyrophosphorylase activity and ability to accumulate phosphoribosyl pyrophosphate, and containing nucleotide pyrophosphorylase activity and subsequently isolating the thus formed 5'-inosinic acid.

2. A method as in claim 1 wherein the cultured media (1) and (2) are prepared separately and subsequently combined in a single culture medium for further cultivation.

3. A method as in claim 1 wherein the cultured media (1) and (2) are obtained by symbiotic culturing of the said hypoxanthine accumulating mutant of a *Brevibacterium ammoniagenes* and of the said *Brevibacterium ammoniagenes* microorganism having a high nucleotide pyrophosphorylase activity and ability to accumulate phosphoribosyl pyrophosphate.

4. A method as in claim 1 wherein the cultured media (1) and (2) are obtained by culturing the hypoxanthine accumulating microorganism in one portion of a culture medium while at substantially the same time culturing the nucleotide pyrophosphorylase active microorganism in a separate portion of the same culture medium.

5. A method as in claim 1 wherein the cultured media (1) and (2) are present in the final culture medium in substantially equal amounts.

6. A method as in claim 1 wherein the hypoxanthine accumulating microorganisms is *Brevibacterium ammoniagenes* No. 7209–1 ATTC No. 15454 and the microorganism which possesses activity to produce nucleotide pyrophosphorylase and to accumulate phosphoribosyl pyrophosphate is *Brevibacterium ammoniagenes* ATCC No. 6872.

7. A method as in claim 1 wherein the hypoxanthine accumulating microorganism is *Brevibacterium ammoniagenes* ATCC No. 15187 and the microorganism which possesses activity to produce nucleotide pyrophosphorylase and to accumulate phosphoibosyl pyrophosphate is *Brevibacterium ammoniagenes* ATCC No. 6872.

8. A method as in claim 3 wherein the microorganisms employed in the symbiotic culture are *Brevibacterium ammoniagenes* No. 7209–1 ATCC No. 15454 and *Brevibacterium ammoniagenes* ATCC No. 6872.

9. A method as in claim 1 wherein the separation of the 5'-inosinic acid is effected by centrifuging the final culture medium to separate the cells from the liquid, and subsequently subjecting the resultant liquid to ion exchange treatment thus effecting the separation of the 5'-inosinic acid.

References Cited

UNITED STATES PATENTS

| | | | |
|---|---|---|---|
| 3,118,820 | 1/1964 | Uchida et al. | 195—28 |
| 3,152,966 | 10/1964 | Kinoshita et al. | 195—28 |

ALVIN E. TANENHOLTZ, *Primary Examiner.*

A. LOUIS MONACELL, *Examiner.*